US009188195B2

(12) United States Patent
Iwasa

(10) Patent No.: US 9,188,195 B2
(45) Date of Patent: Nov. 17, 2015

(54) PLANETARY GEAR DEVICE FOR VEHICLE POWER TRANSMISSION DEVICE

(71) Applicant: Toyota Jidosha Kabushiki Kaisha, Toyota-shi, Aichi (JP)

(72) Inventor: Tomoatsu Iwasa, Los Angeles, CA (US)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 22 days.

(21) Appl. No.: 14/268,612

(22) Filed: May 2, 2014

(65) Prior Publication Data

US 2014/0243145 A1 Aug. 28, 2014

Related U.S. Application Data

(63) Continuation of application No. 14/131,966, filed as application No. PCT/JP2011/065827 on Jul. 11, 2011, now abandoned.

(51) Int. Cl.
| *F16H 1/28* | (2006.01) |
| *F16H 3/72* | (2006.01) |
| *F16H 57/02* | (2012.01) |
| *B60K 17/00* | (2006.01) |
| *F16H 57/08* | (2006.01) |
| *F16H 37/10* | (2006.01) |

(52) U.S. Cl.
CPC .................. *F16H 1/28* (2013.01); *F16H 3/727* (2013.01); *B60K 17/00* (2013.01); *F16H 57/08* (2013.01); *F16H 57/082* (2013.01); *F16H 2037/101* (2013.01); *F16H 2057/02017* (2013.01); *F16H 2200/2007* (2013.01)

(58) Field of Classification Search
CPC .............. F16H 1/28; F16H 2200/2007; F16H 2057/02017; F16H 1/32; F16H 57/082; F16H 57/08; B60K 17/00
USPC ....................................................... 475/331, 5
See application file for complete search history.

(56) References Cited

U.S. PATENT DOCUMENTS

| 8,360,927 B2 * | 1/2013 | Murata et al. ................. 475/347 |
| 2002/0094898 A1 * | 7/2002 | Hata et al. ......................... 475/5 |

(Continued)

FOREIGN PATENT DOCUMENTS

| JP | 1-122542 | 8/1989 |
| JP | 2002-274201 | 9/2002 |

(Continued)

*Primary Examiner* — Edwin A Young
*Assistant Examiner* — Colby M Hansen
(74) *Attorney, Agent, or Firm* — Finnegan, Henderson, Farabow, Garrett & Dunner, LLP

(57) ABSTRACT

A planetary gear device of vehicular power transmitting system includes a carrier, pinion gears, a sun gear, a ring gear, and a cylindrical output member disposed coaxially with the carrier and having the ring gear on inner surface, and a radially outer output gear on outer surface. The carrier is supported by a stationary support wall non-rotatably. The carrier is fixed to the support wall within a teeth width of the output gear. The carrier has support pins rotatably supporting the pinion gears respectively, a carrier body fitted with one end of each the support pin and fixedly fitted in the support wall non-rotatably, and a carrier cover connected to connecting portions extending from the carrier body and fitted with the other end of each the support pin. The support wall has support arm which abuts with the carrier cover. The carrier cover is fixed to the support arm.

5 Claims, 3 Drawing Sheets

(56) References Cited

U.S. PATENT DOCUMENTS

2008/0261740 A1 * 10/2008 Shimizu ............................ 475/5
2009/0093335 A1    4/2009 Yokouchi et al.
2013/0345009 A1   12/2013 Iwasa

FOREIGN PATENT DOCUMENTS

| JP | 2007-263354 | 10/2007 |
| JP | 2009-92123 | 4/2009 |
| WO | WO 2012/086036 A1 | 6/2012 |

* cited by examiner

PLANETARY GEAR DEVICE FOR VEHICLE POWER TRANSMISSION DEVICE

CROSS-REFERENCE TO RELATED APPLICATIONS

This application is a continuation of U.S. application Ser. No. 14/131,966, which is a national phase application of International Application No. PCT/JP2011/065827, filed Jul. 11, 2011, the content of each of which is incorporated herein by reference.

TECHNICAL FIELD

The present invention relates to a planetary gear device provided in a vehicular power transmitting system and having a carrier configured so as to be fixedly fitted in a casing such that the carrier is not rotatable relative to the casing, and more particularly to techniques for reducing uneven load distribution due to inclination of the carrier, and vibrations caused by the uneven load distribution.

BACKGROUND ART

There is known a planetary gear device provided in a vehicular power transmitting system and having a carrier which rotatably supports pinions held in engagement with a sun gear and a ring gear and which is accommodated within a casing. Patent Documents 1 through 3 disclose examples of such a planetary gear device. In the planetary gear device of Patent Document 1, the carrier is merely fitted in the casing, and is not completely fixed to the casing, so that the carrier rotatably supporting pinion gears held in engagement with the ring gear formed in an inner circumferential surface of a cylindrical output member is inclined due to a reaction force received from a counter drive gear held in engagement with a radially outer gear of the cylindrical output member, giving rise to a drawback of uneven load distribution of the pinion gears due to the inclination of the carrier, which causes generation of vibrations and noises.

PRIOR ART DOCUMENTS

Patent Documents

Patent Document 1: JP-2002-274201 A
Patent Document 2: JP-2007-263354 A
Patent Document 3: JP-2009-092123 A

SUMMARY OF THE INVENTION

Object Achieved by the Invention

On the other hand, Patent Documents 2 and 3 propose planetary gear devices constructed such that the carrier is fixed to the casing with bolts. In the construction of fixing of the carrier described in Patent Document 2, however, a nut is screwed on an end portion of a pinion shaft rotatably supporting each pinion gear, which end portion extends through the casing, so that the pinion shaft is required to have an extra axial length corresponding to an axial head dimension of the nut, whereby the planetary gear device cannot be made with a short axial dimension. In this respect, the above-indicated type of fixing of the carrier is difficult to be applied to the power transmitting system the maximum axial dimension of which is limited. Further, a transmission torque is borne by a reaction force generated by the pinion gear with a frictional contact of a seating face of the bolt with the casing, giving rise to a problem of easy loosening of the nut due to reduction of a friction three of the seating face, in the power transmitting system the input torque of which constantly varies.

In the construction of fixing of the carrier described in Patent Document 3, a nut is screwed on an end portion of a bolt which extends through the casing and a hole formed in a portion of the carrier located radially outwardly of a pinion shaft rotatably supporting each pinion gear, so that the bolt is required to have an extra axial length corresponding to the axial head dimension of the nut, whereby the planetary gear device cannot be made with a short axial dimension. In this respect, the above-indicated type of fixing of the carrier is difficult to be applied to the power transmitting system the maximum axial dimension of which is limited. Further, this construction of fixing of the carrier suffers from a comparatively large distance from an axial position at which the carrier is fixed with the bolts, that is, from a position of a surface of the casing against which the carrier is pressed with the bolts, or from a position of a surface of a friction plate which is squeezed between opposite surfaces of the casing and against which the carrier is pressed, to a load point of the carrier, that is, to a position of engagement of the pinion gear rotatably supported by the carrier, so that a large load acts on each bolt, whereby the bolts for fixing the carrier to the casing are required to be disposed at many positions along the entire circumference of the carrier, giving rise to a problem of an increase of the size of the power transmitting system which constantly receives a radial load.

The present invention was made in view of the background art described above. It is therefore an object of the present invention to provide a planetary gear device of a vehicular power transmitting system, which has a carrier fitted in a casing such that the carrier is not rotatable in a circumferential direction relative to the casing, and which is configured to permit reduction of its axial dimension and to permit reduction of inclination of the carrier.

Means for Achieving the Object

As a result of an intensive study in view of the above-described background art regarding the planetary gear device of the vehicular power transmitting system wherein the carrier is fitted in the casing such that the carrier is not rotatable relative to the casing, the present inventor found a flint that the load distribution of the pinion gears is improved to reduce the generation of noises and vibrations by reducing an axial distance or an arm length between a support position at which the carrier is fixedly fitted in the casing, and a position of engagement of the counter drive gear with the radially outer gear of the cylindrical output member which receives a radial toad from the counter drive gear due to the reaction force generated during torque transmission.

The object indicated above is achieved according to the principle of the present invention, which provides a planetary gear device of a vehicular power transmitting system, (a) which is provided with a carrier rotatably supporting pinion gears held in engagement with a sun gear and a ring gear, and a cylindrical output member having the above-described ring gear formed in an inner circumferential surface thereof, and a radially outer output gear which is formed in an outer circumferential surface thereof and which is held in engagement with a downstream side power transmitting gear, the carrier and the cylindrical output member being disposed coaxially with each other about an axis thereof, the above-described carrier being supported by a stationary support wall such that the carrier is not rotatable relative to the support wall, characterized in that (b) a position at which the above-described carrier is fixed to the above-described support wall is located within a width of teeth of the above-described radially outer output gear, as seen in a direction of the axis.

Advantages of the Invention

The planetary gear device of the vehicular power transmitting system according to the present invention is configured such that the position at which the above-described carrier is fixed to the above-described support wall is located within the width of the teeth of the above-described radially outer output gear, as seen in the direction of the axis, so that the reaction force or radial load acting on the power transmitting gear held in engagement with the radially outer output gear of the cylindrical output member is borne by the carrier which is supported by the support wall at the support position located within the width of the teeth of the radially outer output gear, whereby the inclination of the carrier is reduced. Accordingly, it is possible to effectively solve the drawback of uneven load distribution of the pinion gears due to the inclination of the carrier, which causes generation of vibrations and noises.

Preferably, (f) the above-described fixing members are fixing screws each of which is provided with an externally threaded shaft portion screwed in a corresponding one of the above-described support arm portions, and a bead portion having a larger diameter than the above-described shaft portion, and (g) the above-described carrier cover has throughholes through which the shaft portions of the above-described fixing screws extend, and counter bores each of which is formed in one open end portion of a corresponding one of the above-described through-holes remote from the above-described carrier body and which has a larger diameter than the corresponding through-hole, the above-described head portion of the fixing screw being received in the above-described counter bore. In this arrangement, the fixing screws are used to fix the carrier cover constituting a part of the carrier, to the support arm portions of the support wall, such that the head portions of the fixing screws are located within the counter bores formed in the carrier cover, so that it is possible to advantageously prevent an increase of the required axial dimension of the carrier.

Preferably, (h) the above-described carrier body has a plurality of engaging teeth formed in a plurality of radially outer circumferential portions thereof located symmetrically with each other about the above-described axis, such that the engaging teeth extend radially outwardly in the form of a flange, while (i) the above-described support wall has a fitting hole which has a profile similar to an outer profile of the above-described carrier body having the above-described plurality of engaging teeth and in which the above-described carrier body is fitted such that the carrier body is not rotatable relative to said support wall. In this arrangement, the carrier body which is fitted in the fitting hole in the non-rotatable manner is provided with the plurality of radially outer circumferential portions which are located symmetrically with each other about the axis and which are provided with the plurality of engaging teeth. In the conventional planetary gear device wherein the carrier is fitted in the casing such that the carrier is not rotatable relative to the casing, a plurality of engaging teeth are formed in one radially outer circumferential portion of the carrier body about the axis, so that the carrier is pivoted by resultant forces of reaction forces acting on the engaging teeth, about a surface of contact of the carrier with the support wall of the transaxle casing. Where the above-indicated resultant forces periodically vary under the influence of eccentricity of the sun gear and the ring gear, the carrier vibrates about the surface of contact of the carrier with the support wall of the transaxle casing, such that the mutually contacting portions of the engaging teeth and engaging grooves which are formed radially outwardly of the fitting hole and in which the engaging teeth are received are subjected to mutual abrasion. As a result of this vibration of the carrier, the engaging tooth which is most distant from the above-indicated surface of contact has the largest amount of fluctuating movement, so that this engaging tooth and the engaging groove which is formed radially outwardly of the fitting hole and in which that engaging tooth is received are subject to wearing, whereby the relative circumferential position between the carrier and the support wall of the transaxle casing varies, giving rise to deterioration of state of mutual contact between the pinions and the ring and sun gears, which may cause generation of vibrations and noises. According to the present invention, on the other hand, the plurality of engaging teeth are formed in the plurality of radially outer circumferential portions located symmetrical with each other about the axis, so that resultant forces of reaction forces acting on the engaging teeth are offset by each other and thereby reduced, so that the above-indicated drawback is prevented.

Preferably, (j) the above-described carrier body has a boss portion extending in a direction away from the above-described carrier cover, and a third bearing which is fitted on an outer circumferential surface of a rotary shaft on which the above-described sun gear is mounted is fitted in an inner circumferential surface of the above-described boss portion, to rotatably support the above-described rotary shaft. In this arrangement, the third bearing supporting the rotary shaft on which the sun gear is mounted, for instance, a rotor shaft for supporting a rotor of an electric motor, is fitted in the inner circumferential surface of the carrier body, so that the axial dimension of the planetary gear device is further reduced.

Preferably, (k) a first bearing which is fitted in a portion of an inner circumferential surface of the above-described cylindrical output member that corresponds to the above-described radially outer output gear and which rotatably supports the above-described cylindrical output member is fitted in an outer circumferential surface of the above-described carrier cover. In this arrangement wherein the first hearing which is fitted in the portion of the inner circumferential surface of the above-described cylindrical output member that corresponds to the above-described radially outer output gear and which rotatably supports the cylindrical output member is fitted on the outer circumferential surface of the carrier cover, the axial dimension of the planetary gear device is further reduced. This arrangement has a further advantage that the reaction force or radial load acting on the power transmitting gear held in engagement with the radially outer output gear of the cylindrical output member is directly borne by the support wall through the first bearing, which support wall is fixed to the carrier and is located within the width of the teeth of the radially outer output gear or the above-described power transmitting gear held in engagement with the radially outer output gear.

MODE FOR CARRYING OUT THE INVENTION

One embodiment of the present invention will be described in detail by reference to the drawings. In the embodiment described below, the drawings are simplified or transformed as needed, and do not necessarily accurately represent the dimensions and shapes of various elements.

First Embodiment

Figure 1:
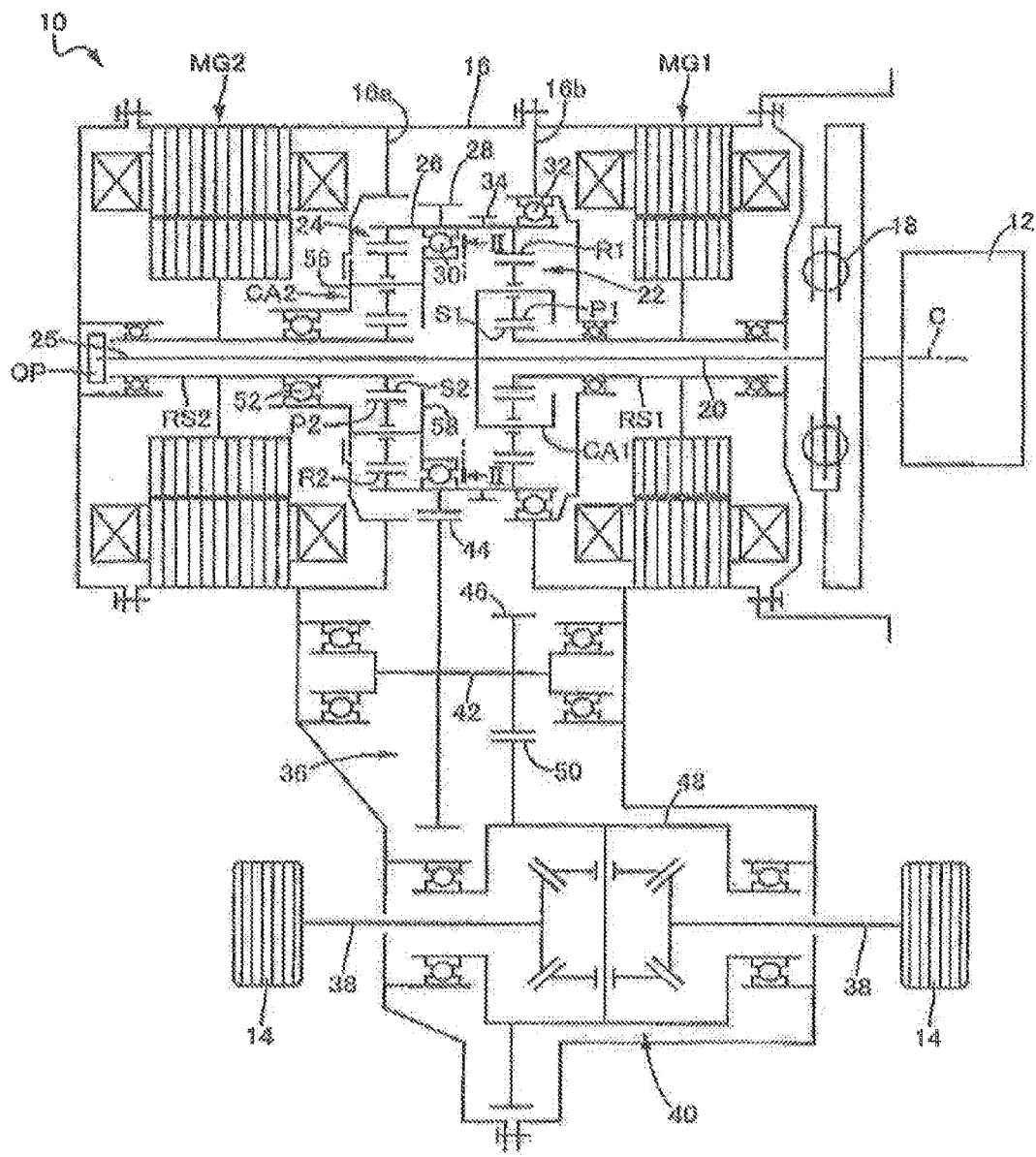
FIG. 1 is a schematic view for explaining an arrangement of a vehicular power transmitting system having a planetary gear device according to one embodiment of this invention.

FIG. 1 is the schematic view for explaining an arrangement of a vehicular power transmitting system 10 according to one embodiment of this invention. As shown in FIG. 1, the vehicular power transmitting system 10 is disposed between an engine 12 and drive wheels 14 in a hybrid vehicle of an FF (front-engine front-drive) type. The above-indicated vehicular power transmitting system 10 has a transaxle casing 16 in which there are disposed: an input shaft 20 connected to an output shaft (crankshaft) of the engine 12 through a damper device 18; and a first motor/generator MG1, a power distributing planetary gear set 22, a speed reducing planetary gear set 24 and a second motor/generator MG2, which are disposed coaxially with the input shaft 20 and arranged in the order of description from the side of the damper device 18. The above-indicated damper device 18, input shaft 20, first motor/generator MG1, power distributing planetary gear set 22, and speed reducing planetary gear set 24, and an oil pump OP driven by a pump drive shaft 25 connected to the second motor/generator MG2 are disposed on a common axis C. The transaxle casing 16, which corresponds to a casing provided according to the present invention, is formed of an aluminum alloy by die casting, for instance. The speed reducing planetary gear set corresponds to a planetary gear device provided according to the invention.

The power distributing planetary gear set 22 is a planetary gear device of a single-pinion type having: a first sun gear S1 splined on an end portion of a first rotor support shaft RS1 of the first motor/generator MG1; a first ring gear R1 formed integrally with an end portion of a cylindrical output number 26 on the side of the power distributing planetary gear set 22; a plurality of first pinions P1 which are disposed radially outwardly of the first sun gear S1 and radially inwardly of the first ring gear R1 and which are held in engagement with the first sun gear S1 and the first ring gear R1; and a first carrier CA1 fixed to the input shaft 20 and supporting the plurality of first pinions P1 such that each of the first pinions P1 is rotatable about its axis and orbitally around the axis C. The cylindrical output member 26 is disposed radially outwardly of the power distributing planetary gear set 22 and the speed reducing planetary gear set 24. This power distributing planetary gear set 22 functions as a power distributing mechanism configured to mechanically distribute a drive force of the engine 12 to the first motor/generator MG1 and the cylindrical output member 26, and is disposed radially inwardly of the cylindrical output member 26 and on one side of the speed reducing planetary gear set 24 which is nearer to the damper device 18.

A portion of the drive force of the engine 12 which is distributed to the first motor/generator MG1 by the power distributing planetary gear set 22 is used to operate the first motor/generator MG1 as an electric generator. The other portion of the drive force of the engine 12 which is distributed to the cylindrical output member 26 by the power distributing planetary gear set 22 is used to drive the drive wheels 14. The above-described cylindrical output member 26 has an integrally formed first drive gear 28 functioning as a radially outer output gear, which is disposed in an intermediate portion thereof as seen in the direction of the axis C, between the first ring gear R1 of the power distributing planetary gear set 22 and a second ring gear R2 of the speed reducing planetary gear set 24.

The first motor/generator MG1 is operated by the engine 12 through the power distributing planetary gear set 22, so as to function as the electric generator which performs a regenerative operation to generate an electric energy to charge a battery or any other electric-energy storage device. The first motor/generator MG1 is also operable as an electric motor (as an engine starter) to drive the engine 12 through the power distributing planetary gear set 22 upon starting of the engine 12, for example.

A differential state of the above-described power distributing planetary gear set 22 is continuously changed by controlling a state of regenerative operation of the first motor/generator MG1. Accordingly, the power distributing planetary gear set 22 and the first motor/generator MG1 constitute an electrically controlled transmission portion configured to continuously change a rotating speed of the cylindrical output member 26 by continuously changing the differential state of the power distributing planetary gear set 22 by controlling an operating state of the first motor/generator MG1. The first drive gear 23 formed on the cylindrical output member 26 functions as an output gear of the above-indicated electrically controlled transmission portion.

The speed reducing planetary gear set 24 is a planetary gear device of a single-pinion type having: the second sun gear S2 splined on an end portion of a second rotor support shaft RS2 of the second motor/generator MG2; a second ring gear R2 formed integrally with the end portion of the cylindrical output member 26 on the side of the speed reducing planetary gear set 24; a plurality of (four, in this embodiment) second pinions P2 disposed radially outwardly of the second sun gear S2 and radially inwardly of the second ring gear R2 and held in engagement with the second sun gear S2 and the second ring gear R2; and a second carrier CA2 which is fitted in a first wall portion 16a of the transaxle casing 16 such that the second carrier CA2 is not rotatable relative to the transaxle casing 10, and which rotatably supports each of the plurality of second pinions P2. This speed reducing planetary gear set 24 functions as a speed reducing device configured to reduce the speed of a rotary motion of the second motor/generator MG2 to be transmitted to the second ring gear R2. It is noted that the second sun gear S2, second ring gear R2, second pinions P2, and second carrier CA2 respectively correspond to a sun gear, a ring gear, pinion gears and a carrier, which are provided according to the present invention.

The second motor/generator MG2 functions as an electric motor which is operated alone or together with the engine 12, to drive the drive wheels 14. The second motor/generator MG2 is driven by the drive wheels 14 during deceleration of the vehicle, for instance, so as to function as an electric generator which generates an electric energy to charge the battery or other electric-energy storage device.

The cylindrical output member 26 is a cylindrical member disposed radially outwardly of the power distributing planetary gear set 22 and the speed reducing planetary gear set 24 which are disposed on the axis C and adjacent to each other on the axis C. The cylindrical output member 26 is supported rotatably about the axis C, by the speed reducing planetary gear set 24 and the transaxle casing 16, respectively through a first bearing 30 disposed radially inwardly of its intermediate portion in the direction of the axis C, and a second bearing 32 disposed radially outwardly of its end portion on the side of the engine 12. The above-indicated first bearing 30 is fixedly fitted on is radially outer portion of the second carrier CA2 of the speed reducing planetary gear set 24 which is fixed to the first wall portion 16a, while the above-indicated second bearing 32 is fixedly fitted in a second wall portion 16b which is disposed radially outwardly of the power distributing planetary gear set 22 and which extends radially inwardly from inner wall of the transaxle casing 16. The first ring gear R1 and the second ring gear R2 are formed integrally with the radially inner portions of the respective opposite end portions of the cylindrical output member 26 as seen in the direction of the axis C, while the first drive gear 28 and a parking lock gear 34 are formed integrally with the radially outer portion of the intermediate portion of the cylindrical output member 26 as seen in the direction of the axis C. The cylindrical output member 26 is a composite gear member having the first ring gear R1, second ring gear R2, first drive gear 28 and parking lock gear 34 which are formed integrally with each other.

The vehicular power transmitting system 10 is further provided with a speed reducing gear device 36 connected to the cylindrical output member 26, and a differential gear device 40 configured to distribute a drive force received from the speed reducing gear device 36, to a pair of left and right axles 38, while permitting a difference between rotating speeds of the axles 38. The speed reducing gear device 36 is configured to transmit a rotary motion of the cylindrical output member 26 to the differential gear device 40 after reduction of the speed of the rotary motion, and is provided with: a first driven gear 44 which is formed integrally with a counter shaft 42 parallel to the input shaft 20 and which is held in engagement with the first drive gear 28; a second drive gear 46 which has a smaller diameter than the first driven gear 44 and which is formed integrally with the counter shaft 42 and a large-diameter ring gear 50 which is fixed to a radially outer portion of a differential casing 48 of the differential gear device 40 and which is held in engagement with the second drive gear 46.

Figure 2:
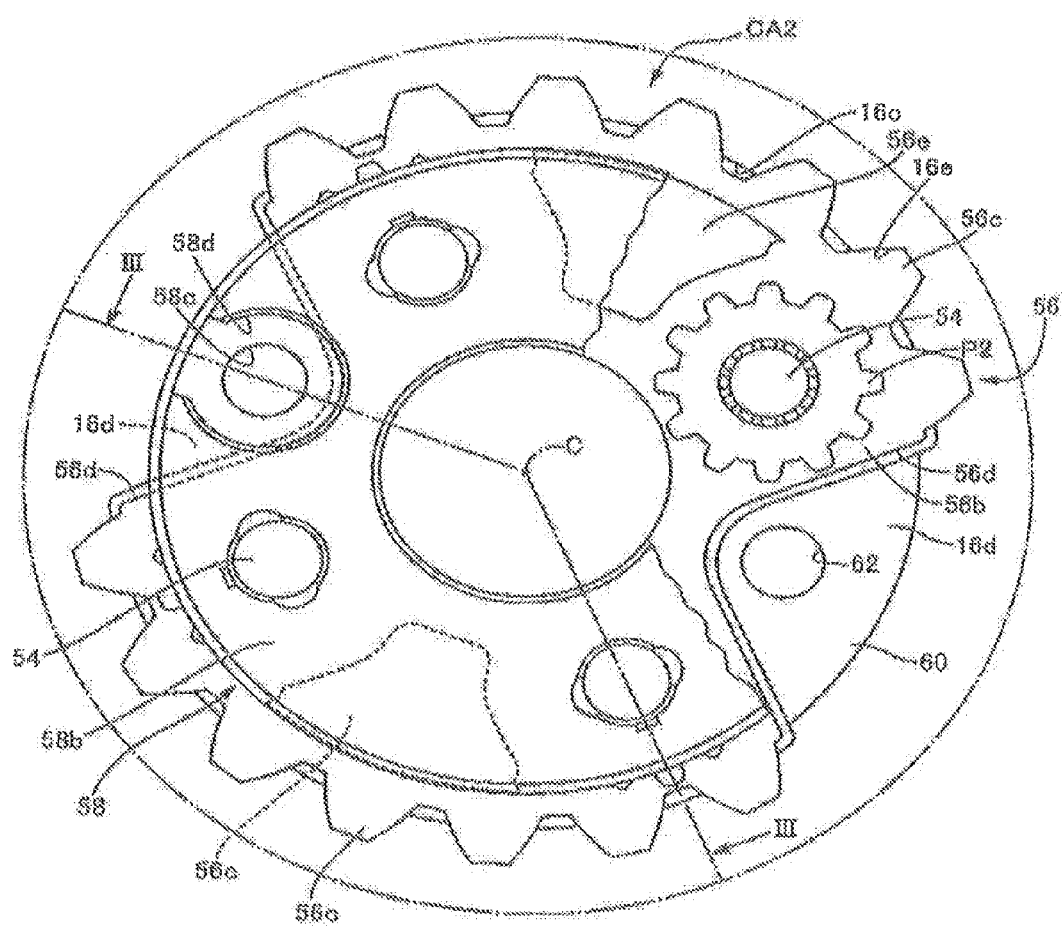
FIG. 2 is a partially cut-away view taken in a direction of arrows II-II of FIG. 1, showing a second carrier fixed to a support wall portion of a transaxle casing.
Figure 3:
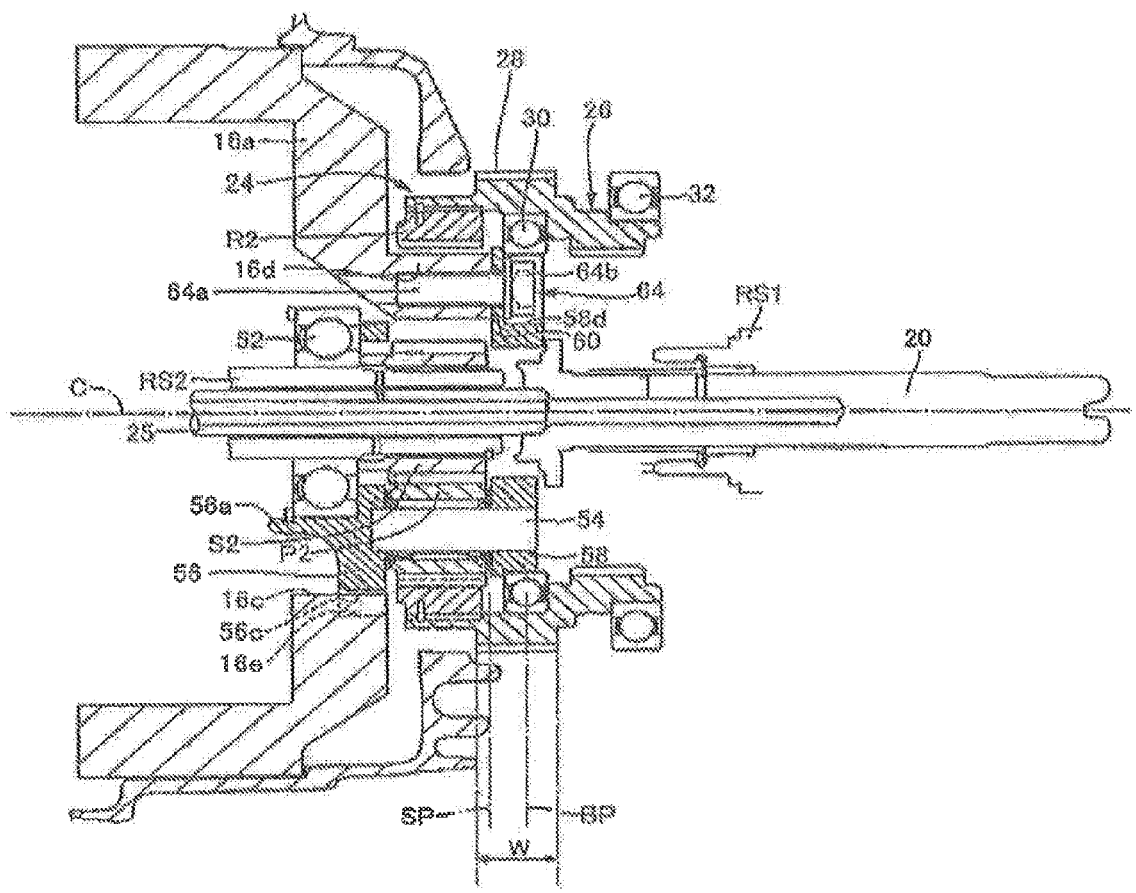
FIG. 3 is a cross sectional view taken along lines III-III of FIG. 2.

In the speed reducing planetary gear set 24, the second carrier CA2 is fitted, at its end portion on the side of the second motor/generator MG2, in a fitting hole 16c formed through the first wall portion (support wall) 16a of the transaxle casing 16 as described below, such that the second carrier CA2 is not rotatable relative to the first wall portion 16a, and is fixed and supported, at its end portion on the side of the first motor/generator MG1, to and by an end portion of each of support arm portions 16d of the transaxle casing 16 which extend from the first wall portion (support wall) 16a in the direction parallel to the axis C, while the second carrier CA2 rotatably supports the cylindrical output member 26 through a third bearing 52. FIG. 2 is the partially cut-away view taken in a direction of arrows II-II of FIG. 1, for explaining a state of installation of the second carrier CA2, showing exclusively the carrier CA2, second pinions P2, and a part of the first wall portion 16a of the transaxle casing 16, when the first bearing 30, second sun gear S2, second rotor support shaft RS2 and pump drive shaft 25 are omitted. FIG. 3 is the cross sectional view taken along lines III-III of FIG. 2. A support structure for the second Carrier CA2 will be described in detail by reference to FIGS. 2 and 3.

The second carrier CA2 is provided with a carrier body 56 and a carrier cover 58 which support a carrier pin 54 at respective opposite ends thereof, which carrier pin 54 rotatably supports each of the second pinions P2. These carrier body 56 and carrier cover 58 are provided integrally with each other, by welding, or by molding of a sintered alloy.

The above-indicated carrier body 56 has: a cylindrical boss portion 56a which extends toward the second motor/generator MG2 and in which the third bearing 52 supporting the second rotor support shaft RS2 at its one end portion is internally fitted; a plate portion 50b in the form of a disc which extends radially outwardly from one end portion of the boss portion 56a on the side of the second pinions P2 and which supports the end portion of each of the plurality of (four in this embodiment) carrier pins 54 spaced apart from each other in the circumferential direction of the carrier body 56, which end portion is on the side of the second motor/generator MG2; two sets of engaging teeth 56c extending radially outwardly from the plate portion 56b, which two sets are located symmetrically with each other about the axis C, each of the two sets consisting of seven engaging teeth 56c in the form of a flat spline; a pair of cutout portions 56d formed in the plate portion 56b, between the two sets of engaging teeth 56c; and connecting portions 56e which are formed between the pair of cutout portions 56d in the circumferential direction and which project from the plate portion 56b so as to reach the carrier cover 58.

The carrier cover 58 has: a plate portion 58b in the form of a disc which is integrally fixed to the end face of each of the connecting portions projecting from the plate portion 56b of the carrier body 56, and which supports each carrier pin 54 at its end portion on the side of the first motor/generator MG1; fixing holes 58c formed through respective parts of the plate portion 58b corresponding to the respective cutout portions 56d of the carrier body 56; and counter bores 58d each of which is formed in an end portion of the corresponding one of the fixing holes 58c, which end portion is open toward the first motor/generator MG1, the counter bores 58d having a predetermined depth.

The first wall portion (support wall) 16a of the transaxle casing 16 has engaging grooves 16e formed radially outwardly in an inner circumferential surface of the fitting hole 16e formed therethrough. These engaging grooves 16e have a profile similar to that of the two sets of engaging teeth 56c (each consisting of the seven teeth) extending radially outwardly from the plate portion 56b of the carrier body 56, and have a depth corresponding to a height dimension of the teeth 56c, so that the engaging grooves 16e are engageable with the teeth 56c. The two sets of engaging teeth 56c (each consisting of the seven teeth) extending radially outwardly from the plate portion 56b of the carrier body 56 are brought into engagement with the engaging grooves 16e, whereby the second carrier CA2 is fitted in the first wall portion (support wall) 16a coaxially with the first wall portion 16a about the axis C, such that the second carrier CA2 is not rotatable relative to the first wall portion 16a.

The support arm portions 16d extending from the above-described first wall portion (support wall) 16a in the direction parallel to the axis C pass through the respective cutout portions 56d formed in the plate portion 56b of the carrier body 56, and reach the carrier cover 58. Each of the support arm portions hid has an end face 60 which is held in abutting contact with the carrier cover 58 and which has a tapped hole 62 in which a fixing screw 64 extending through the fixing hole 58c formed in the plate portion 58b of the carrier cover 58 is screwed, whereby the second carrier CA2 is supported. The second carrier CA2 is supported by the first wall portion (support wall) 16a of the stationary transaxle casing 16, while the end faces 60 of the support arm portions 16d are held in abutting contact with a back surface of the carrier cover 58. The fixing screw 64 consists of an externally threaded shaft portion 64a, and a head portion 64b which has a larger diameter than the shaft portion 64a and a length smaller than a depth of the counter bore 58d.

The cylindrical output member 26 is rotatably supported via the first bearing 30 fitted on an outer peripheral at the carrier cover 58 of the stationary second carrier CA2, and the second bearing 32 fitted in the second wall portion 16b of the transaxle casing 16, and is provided with the first drive gear 28 which is disposed radially outwardly of the first bearing 30 and which functions as the radially outer output gear. As shown in detail in FIG. 3, a support position SP of the second carrier CA2 which is the position of the back surface of the carrier cover 58 and a position BP of the first bearing 30 are located within a width W of teeth of the first drive gear 28 as seen in the direction of the axis C, preferably, within a width of engagement of the first drive gear 28 with the first driven gear 44. Accordingly, an arm length from the support position SP, that is, from a fixing position of the second carrier CA2 to the first drive gear 28 which receives a radial load from the first driven gear 44 is minimized.

The speed reducing planetary gear set 24 of the vehicular power transmitting system according to the present embodiment is configured such that the fixing position or support position SP at which the second carrier CA2 is fixed to the first wall portion (support wall) 16a is located within the width W of the teeth of the first drive gear (radially outer output gear) 28, as seen in the direction of the axis C, so that a reaction force or radial load acting on the first driven gear (power transmitting gear) 44 held in engagement with the first drive gear (radially outer output gear) 28 of the cylindrical output member 26 is borne by the second carrier CA2 which is supported by the first wall portion (support wall) 16a at the support position SP located within the width W of the teeth of the first drive gear 28, whereby the inclination of the second carrier CA2 is reduced. Accordingly, it is possible to effectively solve the drawback of uneven load distribution of the second pinions (pinion gears) P2 due to the inclination of the second carrier CA2, which causes generation of vibrations and noises.

The present embodiment is further configured such that the second carrier CA2 is provided with: the carrier pins (support pins) 54 rotatably supporting the second pinions (pinion gears) P2 respectively; the carrier body 56 in which one end portion of each of the carrier pins 54 is fitted and which is fixedly fitted in the first will portion (support wall) 16a such that the carrier body 56 is not rotatable relative to the first wall portion 16a; and the carrier cover 58 which is integrally connected to the connecting portions 56e extending from the carrier body 56 and in which the other end portion of each of the carrier pins 54 is fitted, and such that the first wall portion (support wall) 16a is provided with the support arm portions 16d which extend in the direction parallel to the axis C, so as to be held in abutting contact with the carrier cover 58, and further such that the carrier cover 58 is fixed to the support arm portions 16d with fixing members (fixing screws 64). In this arrangement, the reaction force or radial load acting on the first driven gear (power transmitting gear) 44 held in engagement with the first drive gear (radially outer output gear) 28 of the cylindrical output member 26 is borne by the end faces 60 of the support arm portions 16d held in abutting contact with a behind side of the carrier cover 58 and located within the width W of the teeth of the first drive gear 28, so that the inclination of the second carrier CA2 is reduced. Accordingly, it is possible to effectively solve the drawback of uneven load distribution of the second pinions (pinion gears) P2 due to the inclination of the second carrier CA2, which causes generation of vibrations and noises.

The present embodiment is also configured such that the above-described fixing members are the fixing screws 64 each of which is provided with the externally threaded shaft portion 64a screwed in a corresponding one of the support arm portions 16d, and the head portion 64b having a larger diameter than the shaft portion 64a, and the carrier cover 58 has the fixing holes 58c through which the shaft portions 64a of the fixing screws 64 extend, and the counter bores 58d each of which is formed in the open end portion of the corresponding fixing hole 58c remote from the carrier body 56 and which has a larger diameter than the corresponding fixing hole 58c. The head portion 64b of the fixing screw 64 is received in the counter bore 58d. In this arrangement, the fixing screws 64 are used to fix the carrier cover 58 to the support arm portions 16d extending from the first wall portion (support wall) 16a, with the carrier cover 58 being held in abutting contact with the end faces 60 of the support arm portions 16d, such that the head portions 64b of the fixing screws 64 are located within the counter bores 58d formed in the carrier cover 58, so that it is possible to advantageously prevent an increase of the required axial dimension of the carrier.

The present embodiment is further configured such that the carrier body 56 has the plurality of engaging teeth 56c formed in the plurality of radially outer circumferential portions thereof located symmetrically with each other about the axis C, such that the engaging teeth 56c extend radially outwardly in the form of a flange, while the first wall portion (support wall) 16a has the engaging grooves 16e having a profile similar to an outer profile of the plate portion 56b of the carrier body 56 having the plurality of engaging teeth 56c. The engaging grooves 16e are formed radially outwardly of the fitting hole 16c in which the carrier body 56 is fitted such that the carrier body 56 is not rotatable relative to the first wall portion 16a. In this arrangement, the carrier body 56 which is fitted in the fitting hole 16c and the engaging groove 16e in a non-rotatable manner is provided with the plurality of radially outer circumferential portions which are located symmetrically with each other about the axis C and which are provided with the plurality of engaging teeth 56c. Accordingly, resultant forces of reaction forces acting on the engaging teeth 56c are offset by each other and thereby reduced, so that the vibrations of the carrier body 56 are further reduced.

The present embodiment is also configured such that the carrier body 56 has the boss portion 56a extending in the direction away from the carrier cover 58, and the third bearing 52 which fitted on the outer circumferential surface of the second rotor support shaft (rotary shaft) RS2 on which the second sun gear S2 is mounted is fitted in the inner circumferential surface of the boss portion 56a, to rotatably support the second rotor support shaft RS2. In this arrangement, the third bearing 52 supporting the second rotor support shaft RS2 on which the second sun gear S2 is mounted is fitted in the inner circumferential surface of the carrier body 56, so that the axial dimension of the speed reducing planetary gear set (planetary gear set) 24 is farther reduced.

The present embodiment is further configured such that the first bearing 30 which is fitted in a portion of the inner circumferential surface of the cylindrical output member 26 that corresponds to the first drive gear (radially outer output gear) 28 and which rotatably supports the cylindrical output member 26 is fitted in the outer circumferential surface of the carrier cover 58. In this arrangement wherein the first bearing 30 which is fitted in the portion of the inner circumferential surface of the cylindrical output member 26 that corresponds to the first drive gear (radially outer output gear) 28 and which rotatably supports the cylindrical output member 26 is fitted on the outer circumferential surface of the carrier cover 58, the axial dimension of the speed reducing planetary gear set (planetary gear device) 24 is further reduced. This arrangement has a further advantage that the reaction force or radial load acting on the first driven gear (power transmitting gear) 44 held in engagement with the first drive gear (radially outer output gear) 28 of the cylindrical output member 26 is directly borne by the end portions of the support arm portions 16d through the first bearing 30, which end portions support the second carrier CA2 and are located within the width W of the teeth of the first drive gear (radially outer output gear) 28.

While the embodiment of this invention has been described in detail by reference to the drawings, it is to be understood that the invention is not limited to the details of the illustrated embodiment, but may be otherwise embodied.

For example, the second carrier CA2 of the above-described speed reducing planetary gear set 24 is provided with the four second pinions P2 rotatably supported by the respective four carrier pins 54, and is supported by the first wall portion (support wall) 16a with the two fixing screws 64, white the carrier body 56 and the carrier cover 58 are connected to each other through the two connecting portions 56e. However, the above-described numbers of the second pinions P2, fixing screws 64 and the connecting portions 56c are given for illustrative purpose only and may be otherwise selected.

In the illustrated embodiment, each of the two sets of engaging teeth 56c located symmetrically with each other about the axis C, and the corresponding set of engaging grooves 16e respectively consist of seven teeth and seven grooves. However, the number of each set of the engaging teeth 56c and engaging grooves 16e is not limited to seven, but may be otherwise selected, for instance, may be selected from among two through eight.

In the illustrated embodiment, the cylindrical output member 26 is rotatably supported by the first bearing 30 interposed between the outer circumferential surface of the carrier cover 58 and an intermediate portion of the inner circumferential surface of the cylindrical output member 26 as seen in the direction of the axis C, and the second bearing 32 fitted on the outer circumferential surface of the power distributing planetary gear set 22. However, the first bearing 30 may be disposed between the outer circumferential surface of the cylindrical output member 26 on the side of the speed reducing planetary gear set 24 and the first wall portion 16a.

It is to be understood that the foregoing description is provided for illustrative purpose only, and that the present invention may be embodied with various other changes and improvements, which may occur to those skilled in the art, without departing from the spirit and scope of the invention.

NOMENCLATURE OF REFERENCE SIGNS

10: Vehicular power transmitting system
16: Transaxle casing (Casing)
16a: First wall portion (Support wall)
16c: Fitting hole
16d: Support arm portions
16e: Engaging grooves
24: Speed reducing planetary gear set (Planetary gear device)
26: Cylindrical output member
28 First, drive gear (Radially outer output gear)
30: First bearing
44: First driven gear (Power transmitting gear)
52: Third bearing
54: Carrier pins (Support, pins)
56: Carrier body
56a: Boss portion
56b: Plate portion
56c: Engaging teeth
56e: Connecting portions
58: Carrier cover
58c: Fixing holes
58d: Counter bores
60: End face
64: Fixing screws (Fixing members)
64a: Shaft portion
64b: Head portion
C: Axis
CA2: Second carrier (Carrier)
MG1 First motor/go/aerator
RS1: First rotor support shaft
MG2: Second motor/generator
RS2: Second rotor support shaft
P2: Second pinions (Pinion gears)
R2: Second ring gear (Ring gear)
S2: Second sun gear (Sun gear)

The invention claimed is:

1. A planetary gear device of a vehicular power transmitting system, which is provided with a carrier rotatably supporting pinion gears held in engagement with a sun gear and a ring gear, and a cylindrical output member having said ring gear formed in an inner circumferential surface thereof, and a radially outer output gear which is formed in an outer circumferential surface thereof and which is held in engagement with a downstream side power transmitting gear, the carrier and the cylindrical output member being disposed coaxially with each other, said carrier being supported by a stationary support wall such that the carrier is not rotatable relative to the support wall, wherein:
  a position at which said carrier is fixed to said support wall is located within a width of teeth of said radially outer output gear, as seen in an axial direction of said carrier and said cylindrical output member;
  said carrier is provided with support pins rotatably supporting said pinion gears respectively, a carrier body in which one end portion of each of said support pins is fitted and which is fixedly fitted in said support wall such that the carrier body is not rotatable relative to the support wall, and a carrier cover which is integrally connected to connecting portions extending from said carrier body and in which the other end portion of each of said support pins is fitted;
  said support wall is provided with support arm portions which extend in the direction parallel to said axis, so as to be held in abutting contact with said carrier cover; and
  said carrier cover is fixed to said support arm portions with fixing members.

2. The planetary gear device according to claim 1, wherein said fixing members are fixing screws each of which is provided with an externally threaded shaft portion screwed in a corresponding one of said support arm portions, and a head portion having a larger diameter than said shaft portion, and said carrier cover has through-holes through which the shaft portions of said fixing screws extend, and counter bores each of which is formed in one open end portion of a corresponding one of said through-holes remote from said carrier body and which has a larger diameter than said corresponding through-hole, said head portion of the fixing screw being received in said counter bore.

3. The planetary gear device according to claim 1, wherein said carrier body has a plurality of engaging teeth formed in a plurality of radially outer circumferential portions thereof located symmetrically with each other about said axis, such that the engaging teeth extend radially outwardly in the form of a flange, while said support wall has fitting hole which has a profile similar to an outer profile of said carrier body having said plurality of engaging teeth and in which said carrier body is fitted such that the carrier body is not rotatable relative to said support wall.

4. The planetary gear device according to claim 1, wherein said carrier body has a boss portion extending in a direction away from said carrier cover,
    and a third bearing which is fitted on an outer circumferential surface of a rotary shaft on which said sun gear is mounted is fitted in an inner circumferential surface of said boss portion, to rotatably support said rotary shaft.

5. The planetary gear device according to claim 1, wherein a first bearing which is fitted in a portion of an inner circumferential surface of said cylindrical output member that corresponds to said radially outer output gear and which rotatably supports said cylindrical output member is fitted on an outer circumferential surface of said carrier cover.

\* \* \* \* \*